(12) United States Patent  (10) Patent No.: US 7,430,748 B2
Wu  (45) Date of Patent: Sep. 30, 2008

(54) NOISE REDUCING OPTICAL DISC DRIVE

(75) Inventor: Jen-Chen Wu, Yunlin (TW)

(73) Assignee: Quanta Storage Inc., Tao Yuan Shien (TW)

( * ) Notice: Subject to any disclaimer, the term of this patent is extended or adjusted under 35 U.S.C. 154(b) by 527 days.

(21) Appl. No.: 11/153,612

(22) Filed: Jun. 16, 2005

(65) Prior Publication Data

US 2006/0288358 A1    Dec. 21, 2006

(51) Int. Cl.
G11B 17/03 (2006.01)
G11B 33/02 (2006.01)

(52) U.S. Cl. ............... 720/611; 720/613; 720/651

(58) Field of Classification Search ........... 720/603, 720/611, 613, 648, 649, 651
See application file for complete search history.

(56) References Cited

U.S. PATENT DOCUMENTS

| 6,317,402 | B1 * | 11/2001 | Huang et al. | 720/603 |
| 6,392,976 | B1 * | 5/2002 | Lin | 720/611 |
| 6,961,947 | B2 * | 11/2005 | Chuang et al. | 720/611 |
| 2003/0133389 | A1 * | 7/2003 | Wang | 369/75.2 |
| 2003/0185131 | A1 * | 10/2003 | Choi | 369/75.2 |
| 2004/0042371 | A1 * | 3/2004 | Lee | 369/75.2 |
| 2004/0066727 | A1 * | 4/2004 | Wu et al. | 369/75.2 |
| 2005/0015782 | A1 * | 1/2005 | Wang | 720/603 |
| 2005/0039198 | A1 * | 2/2005 | You | 720/603 |
| 2007/0079312 | A1 * | 4/2007 | Isoshima et al. | 720/648 |

FOREIGN PATENT DOCUMENTS

| JP | 10177755 A | * | 6/1998 |
| JP | 2001052405 A | * | 2/2001 |
| JP | 2003272368 A | * | 9/2003 |

* cited by examiner

*Primary Examiner*—Brian E Miller
(74) *Attorney, Agent, or Firm*—Birch, Stewart, Kolasch & Birch, LLP

(57) ABSTRACT

A tray-type optical disc drive including an optical disc drive body, a tray, a first ventilation portion and a second ventilation portion is provided. The tray movable in and out of the optical disc drive body includes a side wall and a loader. The loader adjoins the side wall. The loader further has a disc-loading region for receiving an optical disc. The first ventilation portion is disposed on the side wall, and the second ventilation portion is disposed on the loader. The airflow generated when the optical disc rotates passes through the first ventilation portion and the second ventilation portion so as to reduce the noises of the optical disc drive.

21 Claims, 5 Drawing Sheets

NOISE REDUCING OPTICAL DISC DRIVE

This application incorporates by reference Taiwanese application Serial. No. 93112095, filed Apr. 29, 2004.

BACKGROUND OF THE INVENTION

1. Field of the Invention

The invention relates in general to an optical disc drive, and more particularly to a tray-type optical disc drive for noise reduction.

2. Description of the Related Art

In response to the explosive growth in the volume of information, most multi-media products are issued in the form of optical discs. In recent years, consumptive optical discs also experience a stable increase. Nowadays, almost every computer has an optical disc drive. Optical disc drives indeed play a very important role in terms of multi-media products.

An optical disc drive uses an optical pick-up head to retrieve an optical disc which is carried by a disc tray to be loaded into the optical disc drive and rotates therein. A high level optical disc drive is normally capable of driving the optical disc to rotate at a rotation rate over 10,000 rpm. Since the optical disc rotates at a high speed, a strong airflow is generated at the vicinity of the rotating optical disc.

Such a strong airflow would easily cause the disc tray carrying the optical disc to vibrate, hence causing the optical disc to wobble and eventually resulting in an unstable wind shear. The wind shear would further intensify the vibration of the optical disc, generate noise due to the high speed rotation of the optical disc, and make it even more difficult for the optical pick-up head to retrieve the optical disc.

Referring to FIG. 1A, a top view of the disc tray of a conventional tray-type optical disc drive is shown. The tray-type optical disc drive 100 includes a loader 102 and a loader 102 having a disc-loading region 104. Several retainers 106 are disposed on the periphery of the disc-loading region 104 for positioning the optical disc loaded into the disc-loading region 104. As shown in 1A, an aperture 108 is disposed at the bottom of each of the retainers 106 due to the consideration of the formation of the mold.

Referring to FIG. 1B, a bottom view of the disc tray of FIG. 1A is shown. To prevent the airflow generated when the optical disc rotates in a high speed from passing through the apertures 108 disposed on the periphery of the optical disc lest the optical disc might wobble even violently, the conventional method is to attach a sealing tape 116 onto the part of the bottom of the disc tray corresponding to each of the apertures 108 so that the airflow would pass through the apertures 108. The conventional method reduces the overall noises of the optical disc drive by containing the airflow inside the tray. However, the method of attaching a sealing tape 116 onto the bottom of the disc tray not only increases the manufacturing cost in terms of labor and materials, but also increases structure complexity.

SUMMARY OF THE INVENTION

It is therefore an object of the invention to provide a tray-type optical disc drive capable of reducing the noise generated due to the high speed rotation of the optical disc so as to reduce the manufacturing cost.

It is therefore an object of the invention to provide a tray-type optical disc drive including an optical disc drive body, tray, a first ventilation portion and a second ventilation portion. The tray, movable in and out of the optical disc drive body, includes a side wall and a loader. The loader adjoins the side wall. The loader further has a disc-loading region for receiving an optical disc. The first ventilation portion is disposed on the side wall, and the second ventilation portion is disposed on the loader. The airflow generated when the optical disc rotates passes through the first ventilation portion and the second ventilation portion so as to reduce the noises of the optical disc drive.

It is therefore another object of the invention to provide a tray-type optical disc drive including an optical disc drive body and a tray. The tray movable in and out of the optical disc drive body includes a left side wall, a right side wall and a loader. The left side wall and the right side wall respectively have several first through holes. The loader connects the left side wall and the right side wall and has several second through hole. The loader further has a disc-loading region for receiving an optical disc. The airflow generated when the optical disc rotates passes through the first through holes and the second through holes so as to reduce the noises of the optical disc drive.

Other objects, features, and advantages of the invention will become apparent from the following detailed description of the preferred but non-limiting embodiments. The following description is made with reference to the accompanying drawings. Anyone who is skilled in related technology would be able to understand and implement the technology accordingly.

DETAILED DESCRIPTION OF THE INVENTION

The tray-type optical disc drive of the invention mainly includes an optical disc drive body, a tray, and several ventilation portions. The ventilation portions are distributed on the vertical wall disposed on the two lateral sides of the tray, front outer edge or right outer end of the disc tray for the airflow generated when the optical disc disposed on the disc tray rotates to pass through the above ventilation portions to reduce the noises of the optical disc drive.

Figures 1A, 1B:
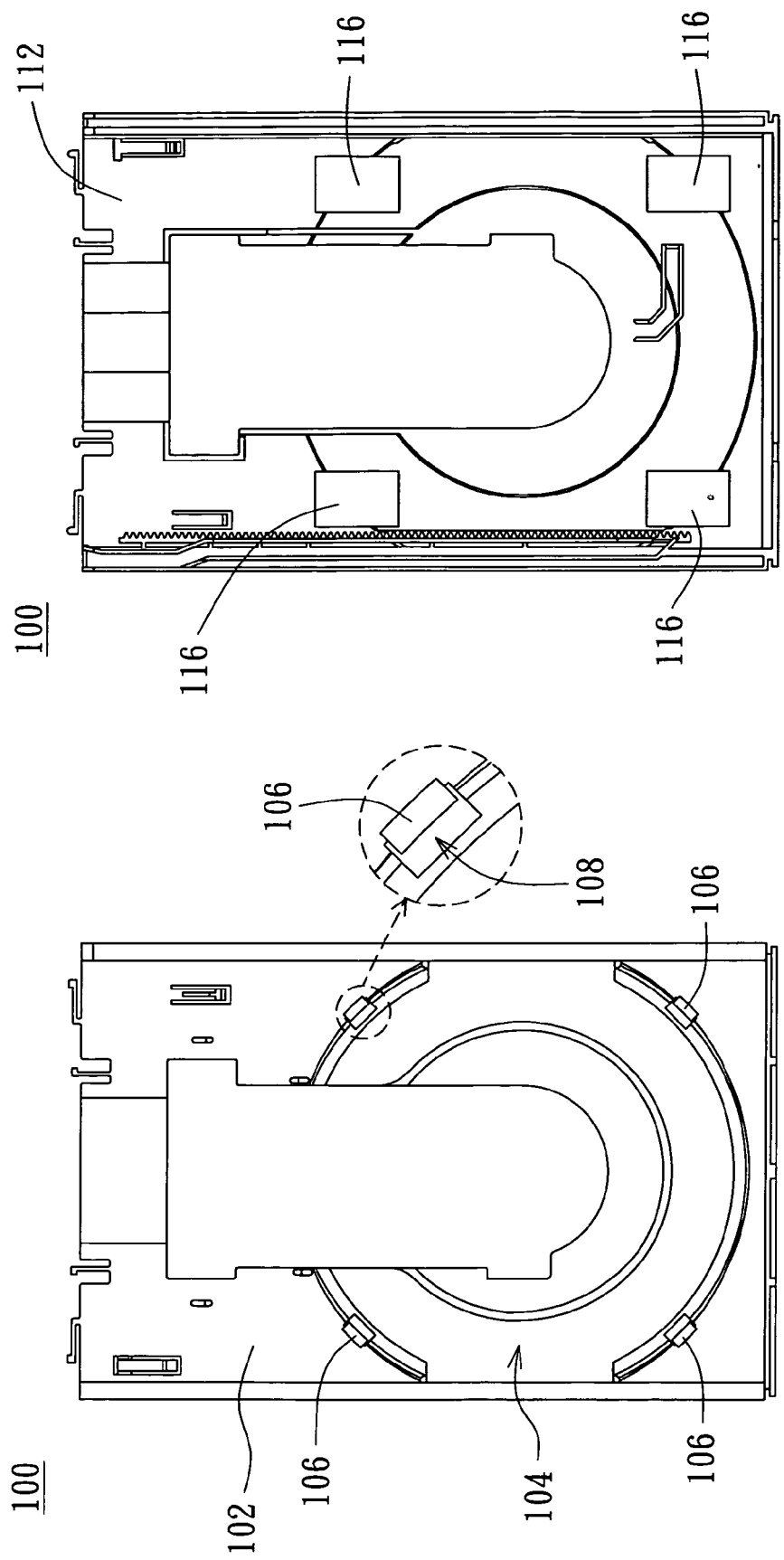
FIG. 1A (Prior Art) is a top view of the disc tray of a conventional tray-type optical disc drive.
FIG. 1B (Prior Art) is a bottom view of the disc tray of FIG. 1A.
Figure 2:
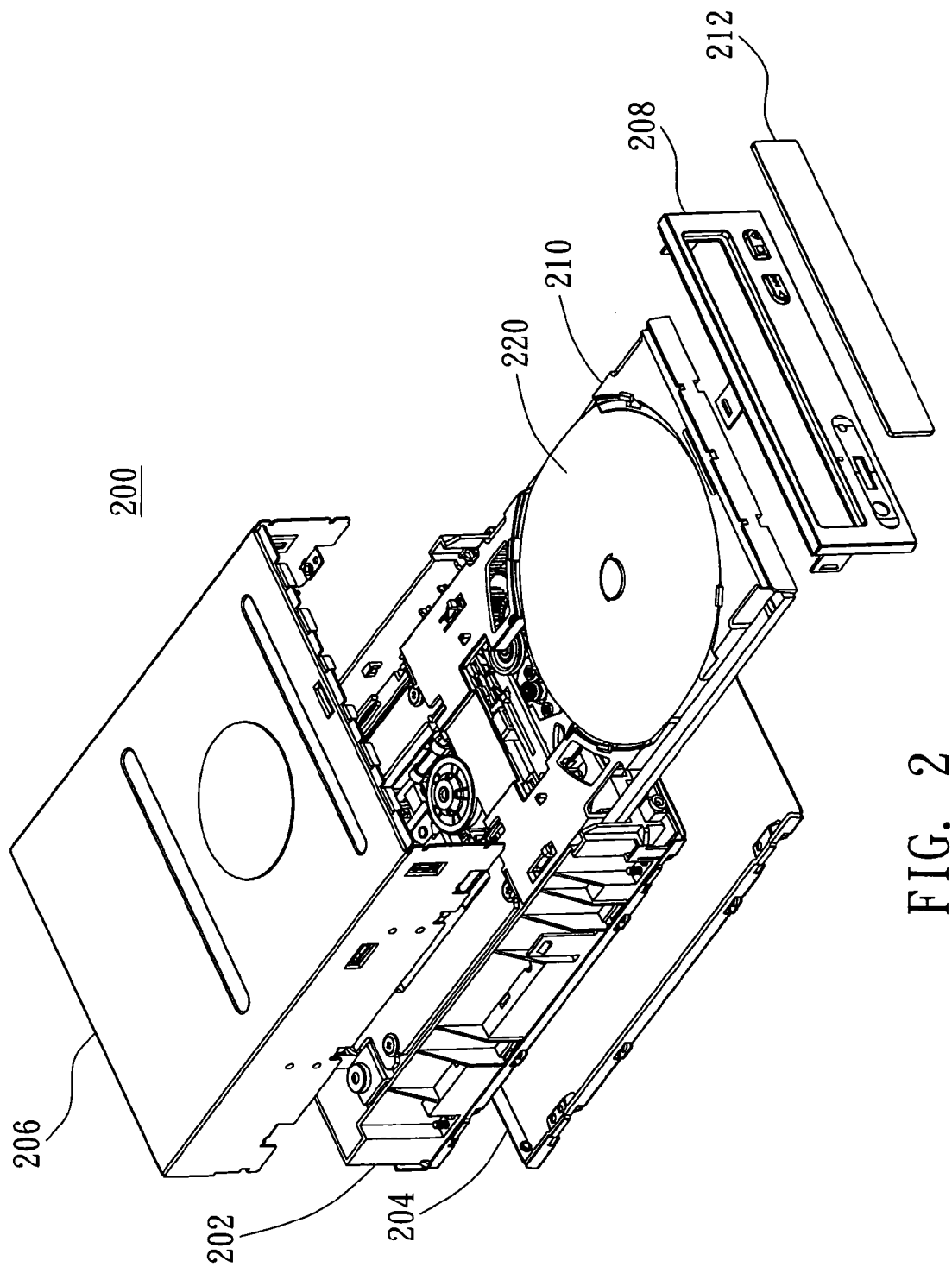
FIG. 2 is a three-dimensional exploded diagram of a tray-type optical disc drive is according to a preferred embodiment of the invention.

Referring to FIG. 2, a three-dimensional exploded diagram of a tray-type optical disc drive according to a preferred embodiment of the invention is shown. The tray-type optical disc drive 200 includes a base unit 202, a lower cover 204, an upper cover 206, a face panel 208, a door panel 212 and a disc tray 210. The door panel 212 is coupled and assembled with the disc tray 210. The base unit 202, the lower cover 204, the upper cover 206 and the face panel 208 are coupled and assembled together to form an optical disc drive body. The disc tray 210 is movable in and out of the optical disc drive body. The disc tray 210 is for carrying the optical disc 220 to be loaded into the optical disc drive body so that the optical disc 220 can be retrieved by the optical disc drive body.

Figures 3A, 3B:
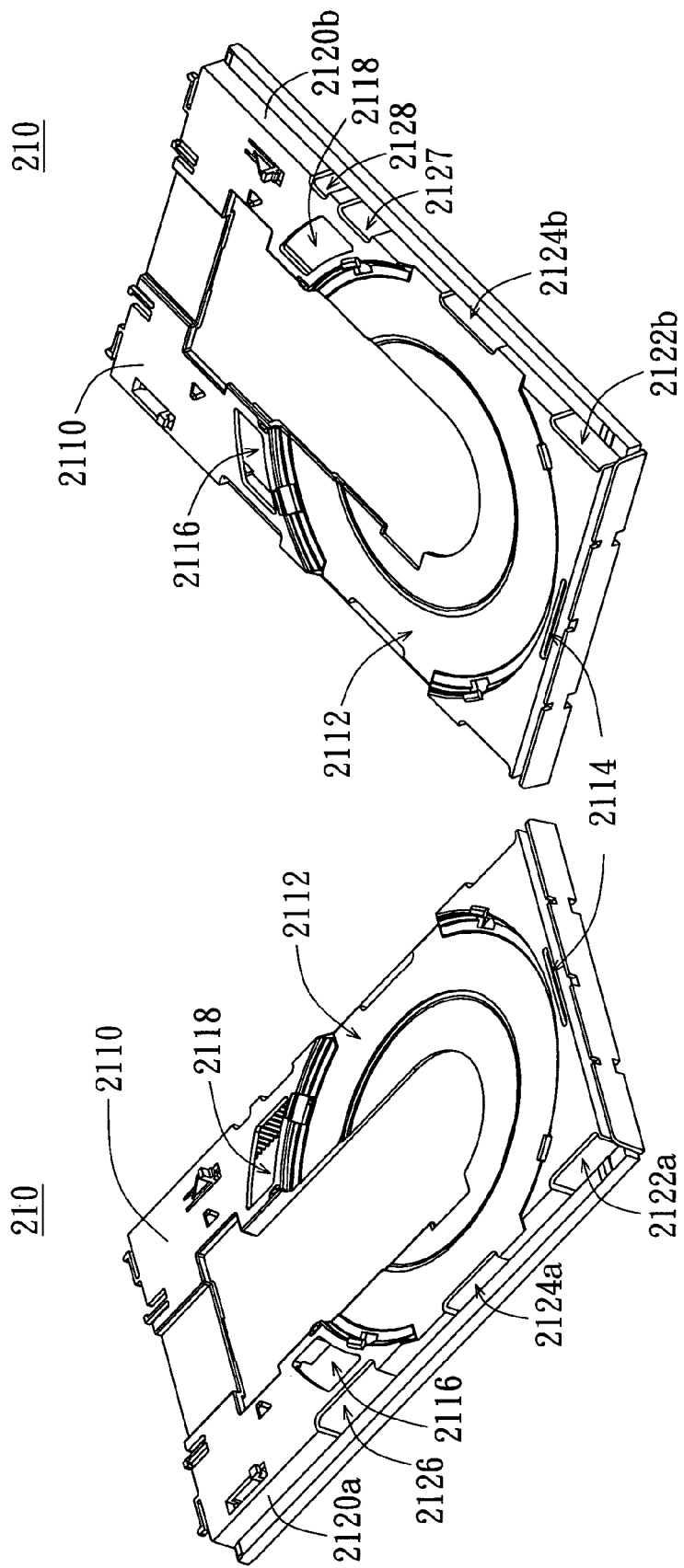
FIG. 3A is a three-dimensional left side view of the disc tray of FIG. 2.
FIG. 3B is a three-dimensional right side view of the disc tray of FIG. 2.

Referring to FIG. 3A and FIG. 3B, FIG. 3A is a three-dimensional left side view of the disc tray of FIG. 2 while FIG. 3B is a three-dimensional right side view of the disc tray of FIG. 2. The disc tray 210 includes a left side wall 2120a, a right side wall 2120b and a loader 2110. The loader 2110 connects the left side wall 2120a and the right side wall 2120b. The loader 2110 has a disc-loading region 2112 for receiving an optical disc. The first ventilation portion includes several first through holes 2122a, 2122b, 2124a, 2124b, 2126, 2127 and 2128, and can be symmetrically or asymmetrically distributed to be disposed on the left side wall 2120a and the right side wall 2120b of the disc tray 210. The second ventilation portion includes several second through holes 2114, 2116 and 2118 disposed on the loader 2110.

As shown in FIG. 3A and FIG. 3B, the first through hole 2122a disposed on the left side wall 2120a and the first through hole 2122b disposed on the right side wall 2120b are symmetrically disposed in the front end of the disc-loading region 2112. The first through hole 2124a disposed on the left side wall 2120a and the first through hole 2124b disposed on the right side wall 2120b are symmetrically disposed on the lateral sides of the disc-loading region 2112. The first through hole 2126 disposed on the left side wall 2120a and the first through holes 2127 and 2128 disposed on the right side wall 2120b are symmetrically disposed on the rear end of the disc-loading region 2112. Comparing FIG. 3A with FIG. 3B, the first through hole disposed at the rear end of the disc-loading region 2112 is asymmetrically distributed to be disposed on the left side wall 2120a and the right side wall 2120b of the disc tray 210. The left side wall 2120a of the disc tray only has a first through hole 2126, but the right side wall 2120b of the disc tray has two first through holes 2127 and 2128. Besides, the second through hole 2114 of the loader 2110 is disposed in the front end of the disc-loading region 2112, while the second through holes 2116 and 2118 are disposed in the rear end of the disc-loading region 2112.

Since the mold for forming the disc tray is a top-and-bottom mold includes a top mold and a bottom mold, the second ventilation portion of the loader 2110 can be formed using the top-and-bottom mold without increasing extra cost for the mold. However, if the first through hole is formed on the left right side wall only, a lateral slider is required when manufacturing the top-and-bottom mold. Considering the mold costs and the manufacturing process, the first through holes 2122a, 2124a and 2126 positioned on the left side wall 2120a can further be extended to the first turning portion formed between the left side wall 2120a and the loader 2110, while the first through holes 2122b, 2124b, 2127 and 2128 positioned on the right side wall 2120b can further be extended to the second turning portion formed between the right side wall and the loader. Thus, the first ventilation portion still can be formed using the top-and-bottom mold without an extra lateral side slider. The first through holes and the second ventilation portions can be formed in the same mold, further reducing the mold costs.

Figure 4A:
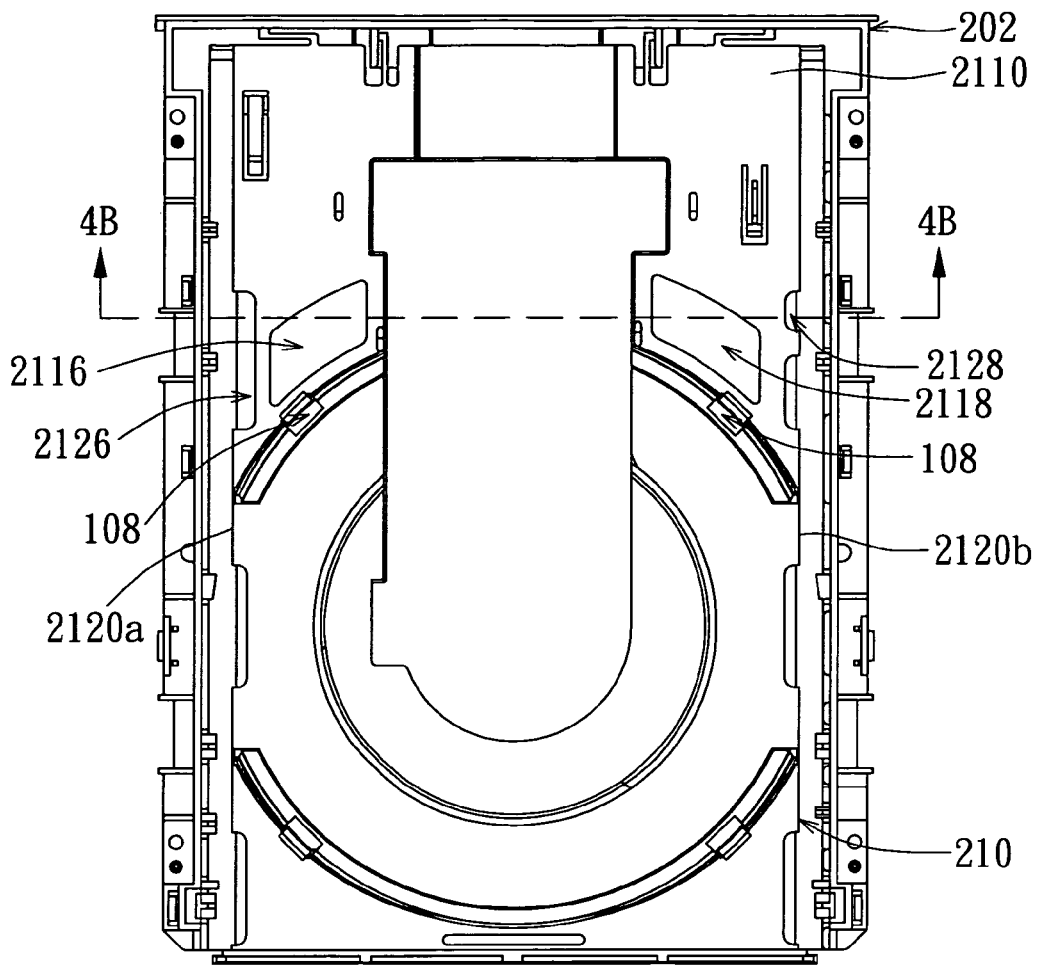
FIG. 4A is a top view of a disc tray and a base unit.
Figure 4B:
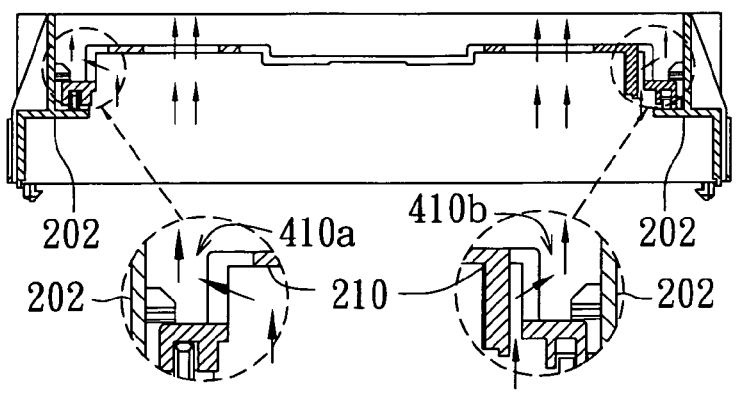
FIG. 4B is a cross-sectional view along the cross-sectional line 4B-4B of FIG. 4A.

Refer to both FIG. 4A and FIG. 4B. FIG. 4A is a top view of disc tray 210 and base unit 202 while FIG. 4B is a cross-sectional view along the cross-sectional line 4B-4B of FIG. 4A. The cross-sectional line 4B-4B is aligned to both the first through holes 2126 and 2128 and the second through holes 2116 and 2118 disposed at the rear end of the disc-loading region 2112.

The principles of reducing noise for the tray-type optical disc drive according to the invention is exemplified by the first through hole 2126 disposed on the left side wall 2120a, the first through hole 2128 disposed on the right side wall 2120b as well as the second through holes 2116 and 2118 disposed on the loader 2110. As shown in FIG. 4B, a first clearance 410a and a second clearance 410b exist between the base unit 202 and the left right side wall of the disc tray 210. When the optical disc drive is operating, a strong airflow is generated due to the high speed rotation of the optical disc. The air flows in the directions shown in the arrows of FIG. 4B. That is, the air which has a pressure difference in the air flow field flows upwards toward the bottom of the disc tray 210 from underneath the disc tray 210. Next, part of the air flowing upwards turns to the left right side wall 2120a and 2120b. Then the air passes through the first through holes 2126 and 2128. Being blocked by the base unit 202, the air respectively flows along the first clearance 410a and the second clearance 410b existing between the base unit 202 and the left right side wall, and then the air turns to flow upwards again. Besides, part of the air flowing upwards continues to flows upwards. Most of the air continuing to flow upwards passes through the second through holes 2116 and 2118 with only an infinitesimal part of the air passes through the aperture 108 disposed on the periphery of the optical disc. Therefore, the design of the first through hole and the second through hole largely mitigates the wobbling of the optical disc and forms a muffler effect to reduce the noises.

Figure 5B:
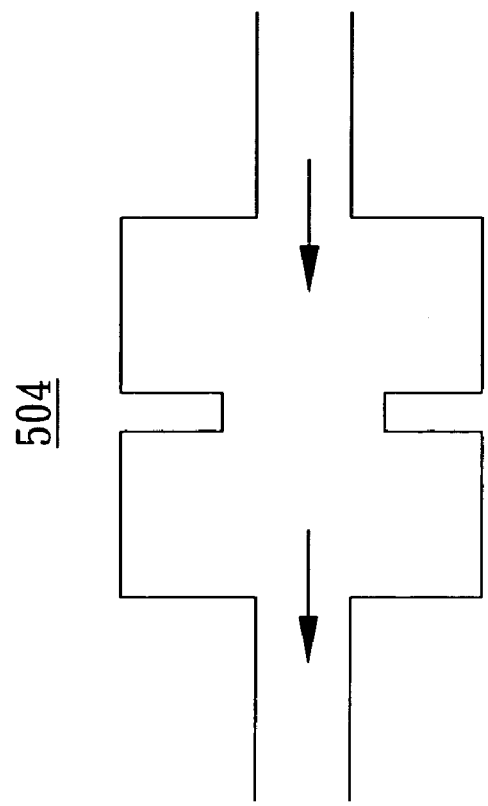
FIG. 5B is a diagram of a reactive muffler.
Figure 5A:
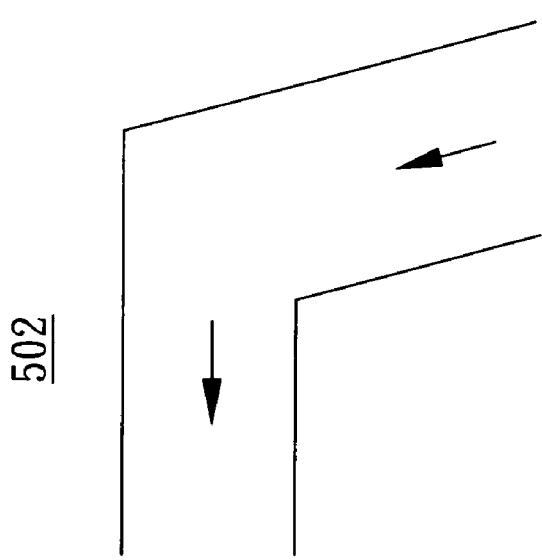
FIG. 5A is a diagram of a dissipative muffler.

The muffler effect is exemplified by FIG. 5A and FIG. 5B. FIG. 5A is a diagram of a dissipative muffler while FIG. 5B is a diagram of a reactive muffler. The directions of the arrows of FIG. 5A and FIG. 5B respectively denote the directions of the air flowing inside the dissipative muffler 502 and the reactive muffler 504. The dissipative muffler 502 of FIG. 5A has a bending. The air suffers energy loss when passing through the bending, thus reducing the air acoustic energy. Normally, the air acoustic energy that the dissipative muffler 502 can reduce is proportional to the bending angle of the dissipative muffler 502. The reactive muffler 504 of FIG. 5B uses the change in the cross-section of the runner of the reactive muffler 504 to form the mismatching of acoustic impedance during acoustic transmission. Part of the acoustic energy is fed back towards the acoustic source, thus reducing the acoustic energy.

Referring to FIG. 4B, a partially enlarged view shows the state when the air flows to the vicinity of the first through holes 2126 and 2128. The airflow generated when the optical disc rotates in a high speed turns to the left right side walls 2120a and 2120b of the disc tray 210 via the periphery of the optical disc first. The air then turns to the first clearance 410a and second clearance 410b through the first through holes 2126 and 2128. While the above situations depict air inside the dissipative muffler 502 of FIG. 5A, the situations that the air enters and passes through the first through holes 2126 and 2128 and that the air enters and passes through the second through hole 2116 and 2118 depict the air inside the reactive muffler 504 of FIG. 5B. It can be seen from the above embodiments that the tray-type optical disc drive of the invention harnesses the effect due to the bending of the runner and the effect due to the change in the cross section of the runner, thus reducing the acoustic energy according to both the dissipative muffler 502 and the reactive muffler 504.

In the above embodiments of the invention, the number of the first through hole of the left right side wall 2120a and 2120b positioned on the disc tray 210 as well as the number of the second through hole of the loader 2110 positioned on the disc tray 210 are not limited to one, or two or three. The first through holes and the second through holes of whatever number are still within the scope of the technology of the invention. Moreover, no matter whether the first through hole disposed on the left side wall 2120a corresponds to the first through hole disposed on the right side wall 2120b or not, and no matter the shape and the size of the corresponding or symmetric first through hole or the corresponding or symmetric second through hole are substantially the same or not are all within the scope of the technology of the invention.

The invention improves the structure of the disc tray to replace the conventional method of attaching a sealing tape. The first ventilation portion and the second ventilation portion direct the flow of the airflow to achieve the object of reducing the acoustic energy according to both the dissipative muffler and the reactive muffler. Besides, the invention tray-type optical disc drive further has the advantage of reducing the noises without incurring any extra manufacturing cost. The noises measured by a microphone at the front end, the back end, the left end and the right end of the optical disc drive show that the invention outdoes the conventional optical disc drive in reducing the noises. Moreover, the inventing dispenses the use of the sealing tape used in the conventional method, further saving the sealing cost.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A tray-type optical disc drive, comprising:
   a body;
   a disc tray movable in and out of the body, wherein the disc tray comprises:
      a side wall, and
      a loader adjoining the side wall and forming a turning portion with the side wall, the loader having a disc-loading region for receiving an optical disc;
   a first ventilation portion disposed on the disc tray, wherein the first ventilation portion is extended from the side wall to the loader across the turning portion so as to be integrally formed with the disc tray; and
   a second ventilation portion disposed on the loader;
   wherein an airflow generated when the optical disc rotates passes through the first ventilation portion and the second ventilation portion so as to reduce the noises generated by the optical disc drive.

2. The tray-type optical disc drive according to claim 1, wherein the first ventilation portion comprises a plurality of first through holes.

3. The tray-type optical disc drive according to claim 2, wherein the side wall comprises a left side wall and a right side wall, the first through holes are extended from the left side wall and the right side wall to the loader.

4. The tray-type optical disc drive according to claim 2, wherein at least one of the first through holes is disposed corresponding to the front end of the disc-loading region.

5. The tray-type optical disc drive according to claim 2, wherein at least one of the first through holes is disposed corresponding to the middle of the disc-loading region.

6. The tray-type optical disc drive according to claim 2, wherein at least one of the first through holes is disposed corresponding to the rear end of the disc-loading region.

7. The tray-type optical disc drive according to claim 1, wherein the second ventilation portion comprises a plurality of second through holes.

8. The tray-type optical disc drive according to claim 7, wherein at least one of the second through holes is disposed corresponding to the front end of the disc-loading region.

9. The tray-type optical disc drive according to claim 7, wherein at least one of the second through holes is disposed corresponding to the rear end of the disc-loading region.

10. The tray-type optical disc drive according to claim 1, wherein the first ventilation portion and the second ventilation portion are formed in one mold.

11. The tray-type optical disc drive according to claim 1, wherein the optical disc drive body has a base unit, a clearance exists between the base unit and the side wall, and the airflow generated when the optical disc rotates flows towards the side wall via a periphery of the optical disc, passes through the first ventilation portion, and then turns to flow through the clearance.

12. The tray-type optical disc drive according to claim 1, wherein the airflow generated when the optical disc rotates flow towards the loader from the periphery of the optical disc, and then passes through the second ventilation portion.

13. A tray-type optical disc drive, comprising:
    a body; and
    a disc tray movable in and out of the body, wherein the disc tray comprises:
       a left side wall and a right side wall, and
       a loader connecting the left side wall and the right side wall, and forming turning portions with the left side wall and the right side wall, wherein the disc tray further has a plurality of first through holes extended from the left side wall and the right side wall to the loader across the turning portions so as to be integrally formed with the disc tray, the loader has a plurality of second through holes and a disc-loading region for receiving an optical disc;
    wherein an airflow generated when the optical disc rotates passes through the first through holes and the second through holes so as to reduce the noises generated by the optical disc drive.

14. The tray-type optical disc drive according to claim 13, wherein at least one of the first through holes is disposed corresponding to the front end of the disc-loading region.

15. The tray-type optical disc drive according to claim 13, wherein at least one of the first through hole is disposed corresponding to the middle of the disc-loading region.

16. The tray-type optical disc drive according to claim 13, wherein at least one of the first through holes is disposed corresponding to the rear end of the disc-loading region.

17. The tray-type optical disc drive according to claim 13, wherein at least one of the second through holes is disposed corresponding to the front end of the disc-loading region.

18. The tray-type optical disc drive according to claim 13, wherein at least one of the second through holes is disposed corresponding to the rear end of the disc-loading region.

19. The tray-type optical disc drive according to claim 13, wherein the first through holes and the second ventilation portions are formed in one mold.

20. The tray-type optical disc drive according to claim 13, wherein the optical disc drive body has a base unit, a first clearance exists between the base unit and the left side wall, and a second clearance exists between the base unit and the right side wall, and the airflow generated when the optical disc rotates flows towards the left side wall and the right side wall from a periphery of the optical disc, passes through the first through holes, and then turns to flow through the first clearance and the second clearance.

21. The tray-type optical disc drive according to claim 13, wherein the airflow generated when the optical disc rotates flows towards the loader from the periphery of the optical disc and then passes through the second through holes.

* * * * *